United States Patent
Peter et al.

[19]

[11] Patent Number: 6,063,150
[45] Date of Patent: May 16, 2000

[54] SELF-CLEANING AND SELF-SEALING PARTICLE FILTER

[75] Inventors: Klaus J. Peter, Natick, Mass.; Osama M. Ibrahim, Kingston, R.I.

[73] Assignee: Rypos, Inc., Cranston, R.I.

[21] Appl. No.: 09/220,655

[22] Filed: Dec. 24, 1998

Related U.S. Application Data

[63] Continuation-in-part of application No. 08/896,613, Jul. 18, 1997, Pat. No. 5,853,437.

[51] Int. Cl.⁷ .................................................. B01D 46/00
[52] U.S. Cl. ............................. 55/282.3; 55/489; 55/523; 55/525; 55/527; 55/DIG. 10; 55/DIG. 30; 60/311
[58] Field of Search ............................. 55/523, 525, 527, 55/486, 487, 482, 489, 283, 282.3, 282, 282.5, DIG. 30, DIG. 10; 60/311; 123/198 E

[56] References Cited

U.S. PATENT DOCUMENTS

| | | | |
|---|---|---|---|
| 4,276,066 | 6/1981 | Bly et al. | 55/523 |
| 4,419,113 | 12/1983 | Smith | 55/267 |
| 4,505,107 | 3/1985 | Yamaguchi et al. | 60/303 |
| 4,516,993 | 5/1985 | Takeuchi et al. | 55/283 |
| 4,523,935 | 6/1985 | Takagi et al. | 55/DIG. 30 |
| 4,881,959 | 11/1989 | Kono et al. | 55/267 |
| 4,902,309 | 2/1990 | Hempenstall | 55/282 |
| 5,149,508 | 9/1992 | Bullock | 55/DIG. 30 |
| 5,207,807 | 5/1993 | Manfre et al. | 55/DIG. 30 |
| 5,228,891 | 7/1993 | Adiletta | 55/DIG. 30 |
| 5,405,422 | 4/1995 | Ueda et al. | 55/267 |
| 5,409,669 | 4/1995 | Smith et al. | 422/174 |
| 5,423,904 | 6/1995 | Dasgupta | 96/146 |
| 5,454,845 | 10/1995 | Anahara et al. | 55/267 |
| 5,457,945 | 10/1995 | Adiletta | 55/301 |
| 5,458,664 | 10/1995 | Ishii et al. | 55/282 |
| 5,571,298 | 11/1996 | Buck | 55/DIG. 30 |
| 5,583,437 | 12/1996 | Peter et al. | 55/282.3 |
| 5,620,490 | 4/1997 | Kawamura | 55/523 |

*Primary Examiner*—Duane S. Smith
*Attorney, Agent, or Firm*—Baralow, Josephs & Holmes, Ltd.

[57] ABSTRACT

A self-cleaning particle filter for Diesel engines is provided. The filter includes a filter housing, control circuitry, a removable filter sandwich and independent power source. The removable filter sandwich includes a number of sintered metal strips sewn and positioned between two sheets of inorganic material to provide a filter sandwich. Current is delivered to the metal filter strips to efficiently burn off carbon, lube oil and unburned fuel particulates which have been filtered from exhaust gas. The filter sandwich is formed into a cylindrical configuration and mounted onto a perforated metal carrier tube for receiving and filtering exhaust gas.

20 Claims, 9 Drawing Sheets

SELF-CLEANING AND SELF-SEALING PARTICLE FILTER

This application is a continuation-in-part of application Ser. No. 08/896,613, filed Jul. 18, 1997, now U.S. Pat. No. 5,853,437.

BACKGROUND OF THE INVENTION

The present invention relates generally to a regenerable filter system. More specifically, the present invention relates to the regenerable self-cleaning filter system for removing carbon, lube oil and unburned fuel particulates from the exhaust of internal combustion engines. In addition, the present invention relates to a regenerable filter for removing particulates from Diesel engine exhaust gases.

In the automotive industry, there has been a tremendous concern over the introduction of harmful pollutants into the air which have been generated by vehicle exhaust. Due to the negative health effects of such emissions, the Environmental Protection Agency of the United States has expressed a desire to reduce particle emissions from internal combustion engines. In the United States, the majority of particulate emissions come from Diesel engines on trucks and buses which have not been regulated as closely as vehicles with gasoline engines.

Various attempts have been made to decrease the particulate emissions from Diesel engines. Unlike with gasoline engine vehicles, existing catalytic converters do not work well with Diesel engines since particulates typically clog these devices since the temperatures within them are too low to effectively burn carbon, lube oil and unburned fuel particles. Other efforts have been made to specifically address the Diesel particulate emissions problem. For example, fired burner systems have been employed to heat a combustion chamber which receives Diesel exhaust for the purpose of burning the particulates within the chamber at very high temperatures. Such combustion chambers suffer from the drawbacks of high initial cost, high complexity, large size, high energy consumption and high maintenance cost.

Another prior art attempt is the employment of passive particle filters and configurations to trap the particulates associated with Diesel emissions. These passive particle filters are commonly made from ceramic and metal, for example. These passive particulate filters are inadequate because when the filter fills up with carbon particles, the back pressure within the exhaust increases to such a level which necessitates that the filter be either regenerated in some fashion or replaced entirely. Since replacing the filter is not practical, many types of regeneration have been attempted, including the raising of the temperature of the filter above the combustion point of the carbon particulates in similar fashion to a self-cleaning oven. These prior art methods of filter regeneration include using a fired burner assembly using some type of fuel; raising the exhaust gas temperature by turbo charging the engine or other means; reducing the ignition temperature of carbon particles by adding a suitable catalyst to the fuel or filter material; and electrical heating. The foregoing methods of filter regeneration are not typically used in vehicles today due to their associated cost and practicality.

In view of the above, there is a demand for a low energy regenerable Diesel exhaust filter which can successfully remove carbon, lube oil and unburned fuel particulates from the exhaust of a Diesel engine. It is also desirable that the regenerable filter be inexpensive to manufacture and use while being efficient in the field. Further, it is desirable that the filter is reliable over long periods of time without maintenance while improving the overall performance and particle holding capacity, even at low differential pressure.

SUMMARY OF THE INVENTION

The present invention preserves the advantages of prior art self-cleaning particle filters. In addition, it provides new advantages not found in currently available filters, and overcomes many disadvantages of such currently available filters.

The invention is generally directed to a novel and unique self-cleaning particle filter with particular application in removing carbon, lube oil and unburned fuel particulates from the exhaust of Diesel engines. The self-cleaning particle filter of the present invention enables the inexpensive assembly, use and maintenance of a self-cleaning particle filter for Diesel engines without detracting from the overall performance of the engine.

The preferred embodiment of the present invention includes four primary members. A filter housing and control; filter sandwich; and independent power source are provided. In particular, the filter sandwich of the present invention is a sandwich of a number of materials which is placed in line with the flow of exhaust gases. A first sheet of inorganic fiber filter material, which is positioned to serve as a downstream filter, mechanical support, electrical and thermal insulation is provided. Sewn to the sheet of inorganic fiber filter material are a number of electrically resistive flat metal strips which are positioned in parallel and spaced apart relation to one another. The flat metal filter strips are positioned to serve as upstream filters. A second sheet of inorganic fiber filter material, providing mechanical support, electrical and thermal insulation is affixed to the first sheet of fiber filter material with the flat metal filter strips sandwiched therebetween to form the filter sandwich. Additional layers of inorganic fiber material can be provided on one of both sides of the filter sandwich to provide additional electrical and thermal insulation as needed to further enhance filter characteristics and performance.

Preferably, the filter sandwich is cylindrical in configuration for ease of manufacture, use and maintenance. A power supply provides voltage source which is electrically connected to the flat metal filter strips to supply current to the strips to heat them above the combustion point of the entrapped Diesel exhaust particulate. The flat metal filter strips are designed so that when voltage is applied across them and current is supplied to them, sufficient heat is generated to bum off Diesel exhaust particulate and regenerate the filter.

It is therefore an object of the present invention to provide an improved Diesel exhaust filter system.

Another object of the present invention is to provide a Diesel exhaust filter sandwich with is electrically regenerated with a minimum amount of energy.

It is a further object of the present invention to provide an exhaust filter which is reliable over long periods of time without maintenance.

It is yet a further object of the present invention to provide a Diesel exhaust filter which has improved overall performance and increased particle holding capacity at low differential pressure.

It is another object of the present invention to provide a Diesel exhaust filter which efficiently removes carbon, lube oil and unburned fuel particles from the exhaust of internal combustion engines.

It is yet a further object of the present invention to provide a low cost Diesel exhaust filter with improved manufacturability.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
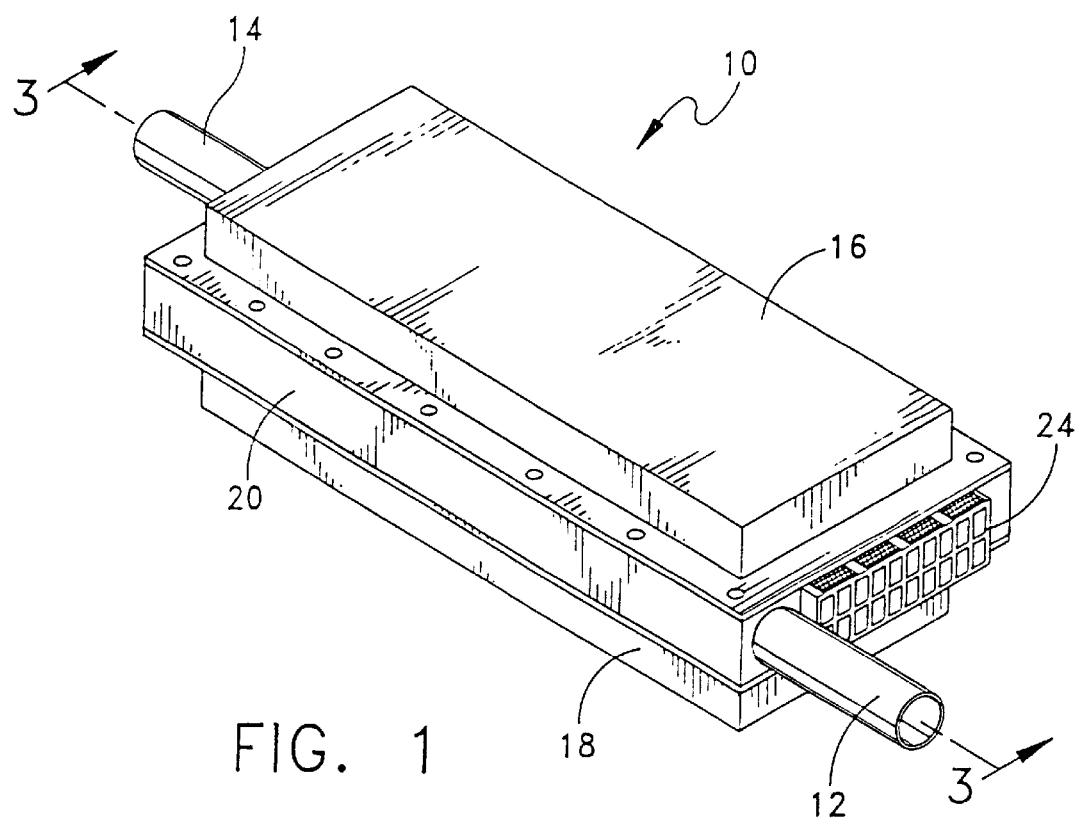
FIG. 1 is perspective view of the self-cleaning particle filter in accordance with the present invention.
Figure 2:
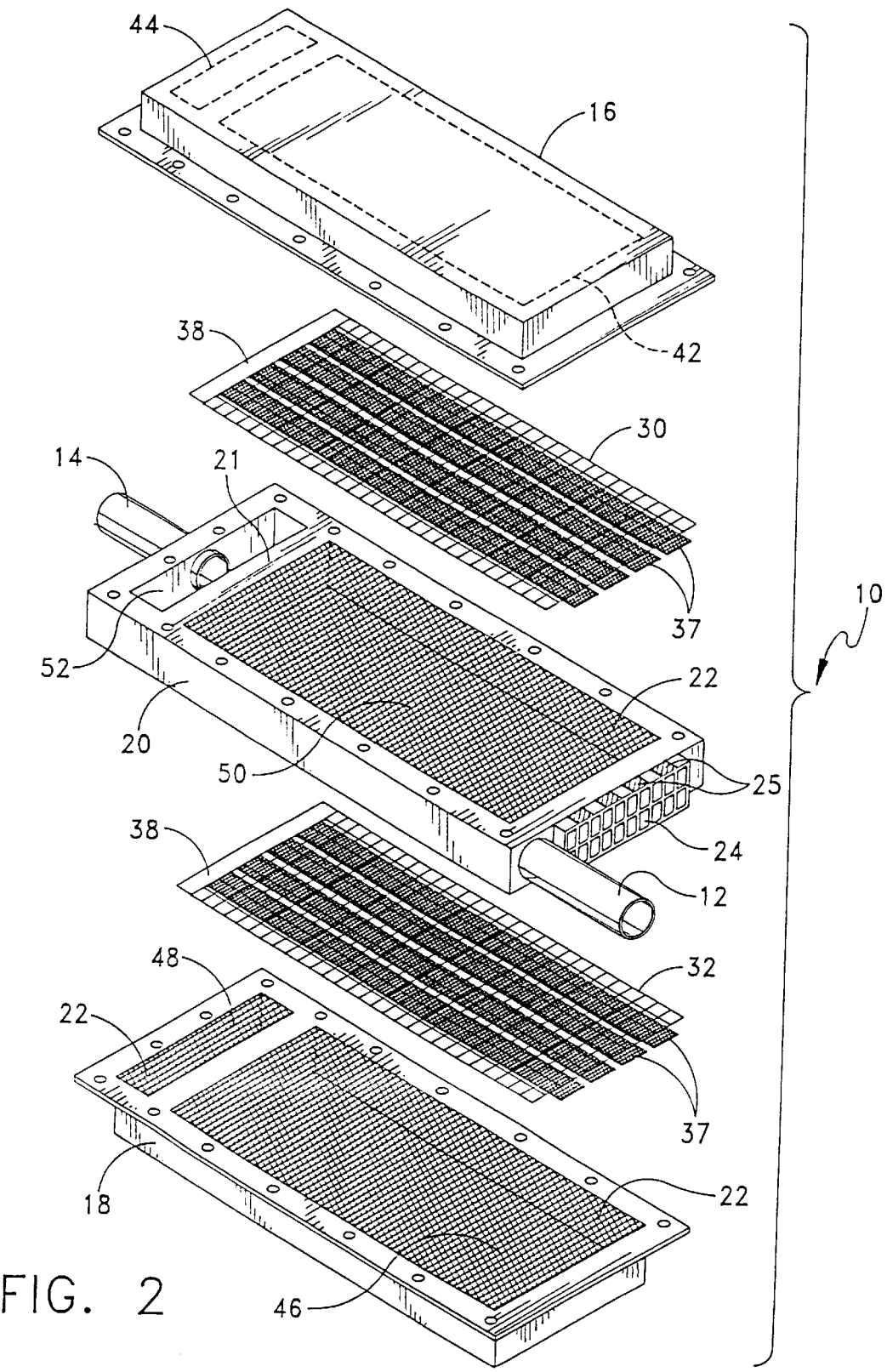
FIG. 2 is an exploded perspective view of the self-cleaning particle filter shown in FIG. 1 in accordance with the present invention.

Referring first to FIGS. 1 and 2, perspective and exploded perspective views of the self-cleaning particle filter 10 of the present invention are shown. Upper housing 16 and lower housing 18 are provided with intermediate housing 20 positioned therebetween. Housing components 16, 18 and 20 are preferably made of metal. Between upper housing 16 and intermediate housing 20 is positioned upper filter sandwich 30 while lower filter sandwich 32 is positioned between intermediate housing 20 and lower housing 18. Intermediate housing 20 includes intermediate main chamber 50 which directly receives unfiltered exhaust via inlet port 12. A support screen 22 is provided at the upper and lower boundary of intermediate main chamber 50 to provide a support of upper filter sandwich 30.

Figure 3:
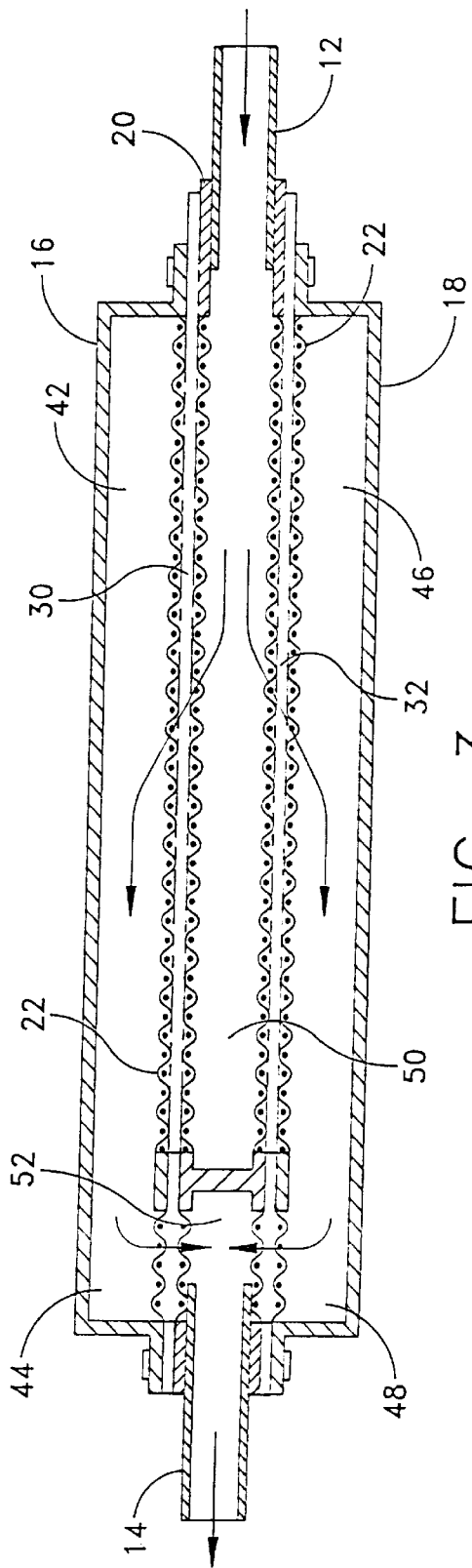
FIG. 3 is a cross-sectional view through the line 3—3 of FIG. 1.

As will be described in detail below in connection with FIGS. 5 and 6, electrical contacts 37 extend from upper sandwich 30 and lower sandwich 32 to electrically connect to corresponding electrical contact pads 25 on control circuitry 24 which, preferably, reside on the exterior of intermediate housing 20. Solid barrier 21 is provided to prevent flow of gas from intermediate main chamber 50 to intermediate exit chamber 52. As a result, as seen in FIG. 3, gases entering from inlet port 12 pass into intermediate main chamber 50 and up through upper sandwich 30 and down through lower filter sandwich 32 for filtering. Filtered exhaust gas then enters upper main chamber 42 and lower main chamber 46 for passage into respective upper exit chamber 44 and lower exit chamber 48. The filtered exhaust gas then passes into intermediate exit chamber 52 for exiting and external exhaust to the environment via outlet port 14.

Figure 4:
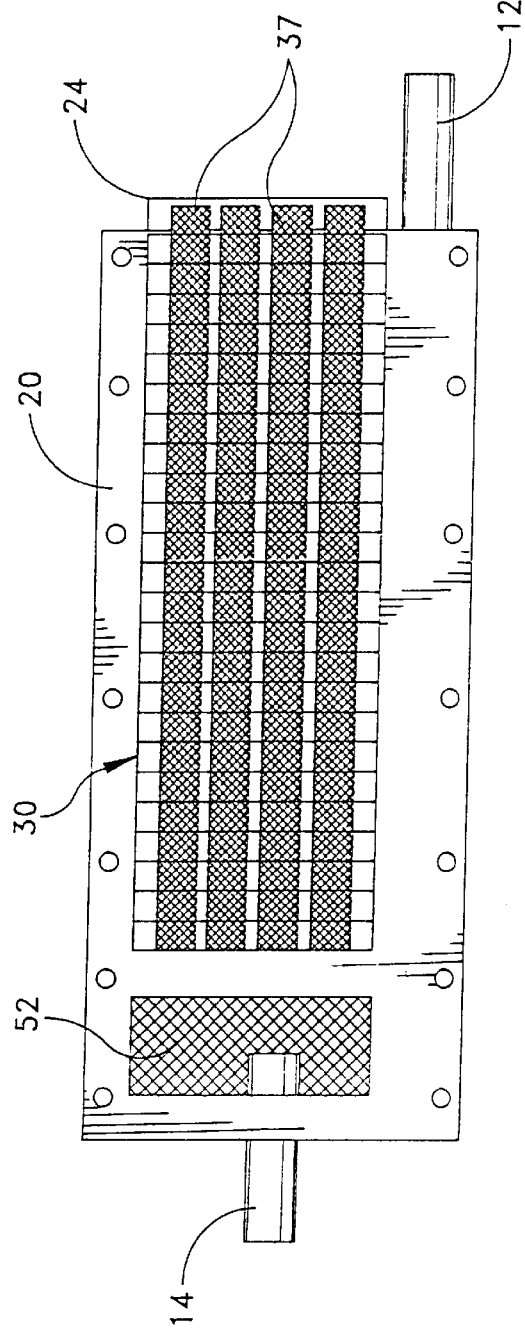
FIG. 4 is a top, partially cut-away view of the self-cleaning particle filter of FIG. 1.

Referring now to FIG. 4, a partial plan view of the self-cleaning particle filter 10 of the present invention is shown. Upper filter sandwich 30 is positioned over intermediate housing 20 to securely rest over intermediate main chamber 50. In addition, electrical contacts 37 extend over control circuit 24 to receive current therefrom for regeneration, as will be described in detail below.

The filter housing, consisting of upper housing 16, lower housing 18 and intermediate housing 22, forces the exhaust gases to flow through the desired filter sandwiches. In the preferred embodiment of FIG. 2, upper sandwich 30 and lower sandwich 32 are provided; however, a single sandwich system may be employed to accommodate different applications. In addition, the flow of exhaust gas may be altered to address various needs of the particular application. Also, more than two sandwiches may be used for additional filtering. Upper housing 16, lower housing 18, and intermediate housing 20 preferably hold in place two filter sandwiches which are composed of the sandwich of multiple materials which will be discussed in connection with FIGS. 5 and 6 below. Similarly, additional layers of metal filter strips 36 and inorganic filter sheets 34 may be employed to provide additional and/or different filter characteristics.

Each of the filter sandwiches 30 and 32 are electrically connected to control circuitry 24 for receipt of current from a voltage source (not shown). Each sandwich 30 and 32 can be independently electrically heated to fully regenerate each element. The heating and regeneration cycles and timing of sandwiches 30 and 32 are controlled by control circuitry 24 which can be programmed in accordance with the desired application. The electrical heating cycle of filter sandwiches 30 and 32 is initiated with a high current pulse to heat the filter element to the carbon combustion temperature in only a few seconds to further reduce total energy requirements. After the initial high current pulse, the electrical current is reduced during actual carbon combustion. Electrical connections to each filter sandwich 30 and 32 are made automatically when the filter housing components 16, 18, and 20 are assembled, closed and locked, holding the sandwiches 30 and 32 in place with the appropriate sealing at all edges. A suitable power supply (not shown) for the filter is provided to deliver sufficient energy to regenerate the filter.

In addition, the self-cleaning particle filter 10 of the present invention optionally includes an exhaust valve arrangement (not shown) which reduces the gas flow in the section of the filter being regenerated to avoid large heat loss by convection. For example, when upper sandwich 30 is being regenerated, current will be supplied to sandwich 30 via the voltage source for heating and resultant regeneration. Simultaneously, the exhaust valve arrangement can direct exhaust flow downwardly through lower filter sandwich 32 for outflow of the exhaust gas via lower main chamber 46. Control circuitry 24, as described above, is preferably mounted externally to intermediate housing 20 to reduce complexity of wire connections, reduce ohmic losses in cables and to increase overall reliability. All pressure sensing, control circuits, heating element switching, as well as solenoid drivers are integrated into control circuitry 24.

Figure 5:
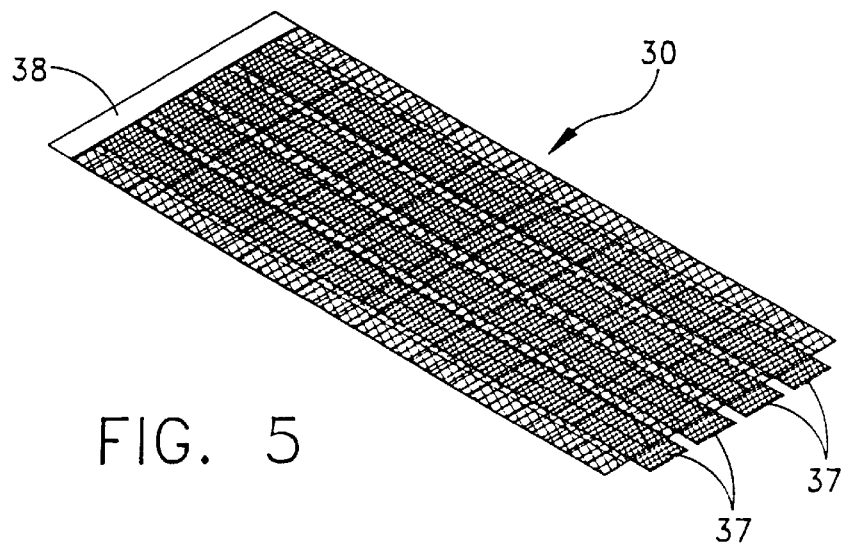
FIG. 5 is a perspective view of the self-cleaning particle filter sandwich in accordance with the present invention.
Figure 6:
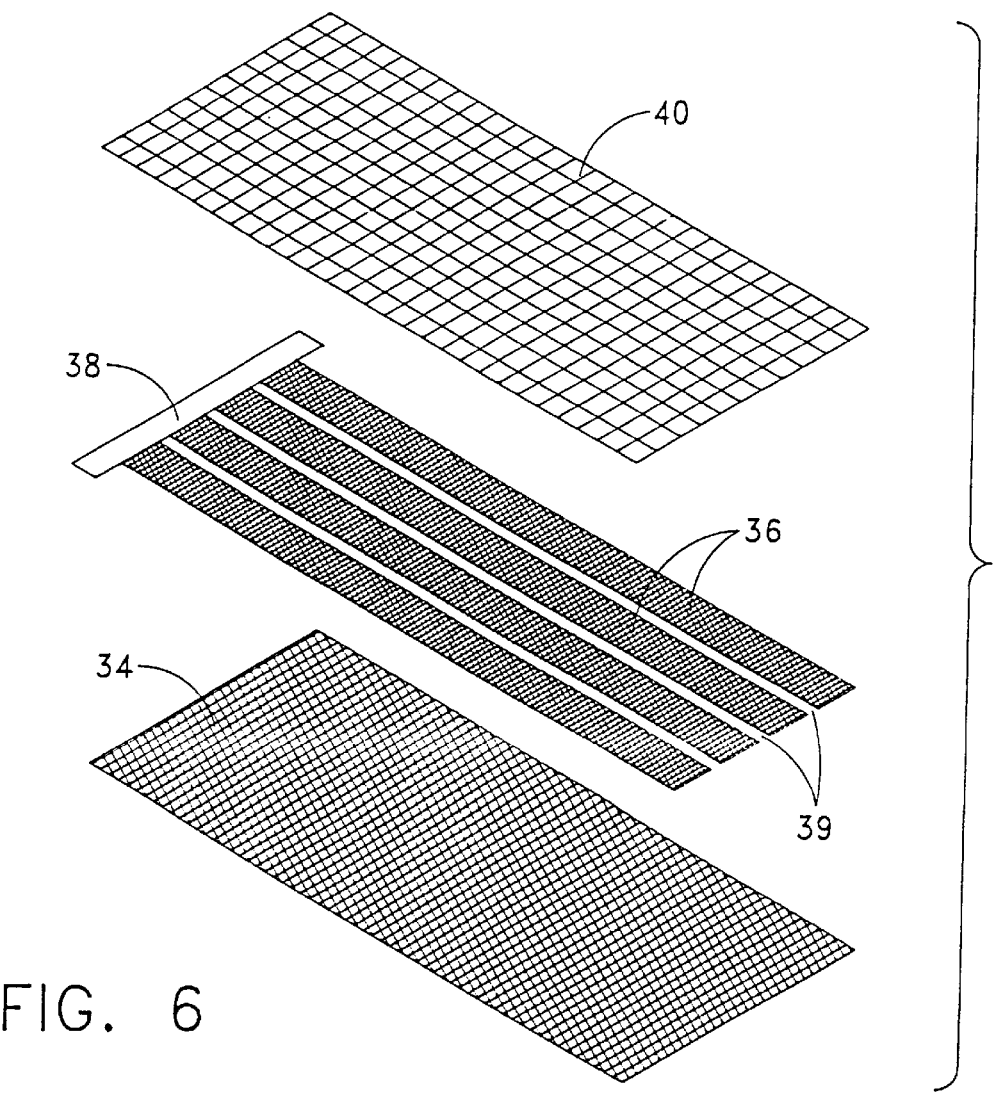
FIG. 6 is an exploded perspective view of the particle filter sandwich shown in FIG. 4.

Turning now to FIGS. 5 and 6, details of the construction of upper filter sandwich 30 and lower filter sandwich 32 are shown. For ease of illustration, details will be discussed in connection with upper filter sandwich 30 only. The construction of lower filter sandwich 32, or any additional filter sandwiches employed, will be identical to upper filter sandwich 30. Specifically, the upstream portion of sandwich 30 includes a number of flat strips 36 of a graded, preferably, sintered metal filter material. Strips 36 are positioned and spaced apart in parallel relation to one another and retain the position by binding material 38 which also provides an electrical common node. The metal filter material is preferably an alloy of iron-chromium-aluminum. Other suitable alloys for the sintered metal strips 36 are nichrome or alloys sold under the names INCOLOY 800 or INCONEL 600. These alloys, particularly the preferred alloy, resists oxidation, carburization and sulphidation at temperatures up to 1100° C.

The metal filter strips 36 are preferably made of a sintered metal construction which is graded in size from one surface to the other, the coarser side being upstream to the exhaust flow. The size of the fibers are chosen so that the filter 10 traps approximately particles as small as 2.5 microns with associated efficiencies varying in accordance with particle size. With certain selected materials, particles of even much smaller size can be filtered. The graded construction of strips 36 holds three to four times as much carbon by weight as ungraded constructions under the same differential pressure conditions which allows longer operation without regeneration, thereby saving energy.

Since the metal upstream filter strips 36 of sandwich 30 also provides ohmic heating elements, the resistance and area are constrained by the voltage and power available. In the exemplary embodiment shown in FIGS. 5 and 6, filter strips 36 are each 2.5 cm wide and 100 cm long. It should be understood that the dimension of the strips may be modified in accordance with the application at hand; namely, the size of the engine, exhaust flow rate and power available. Each such application will have a preferred filter configuration based on available power and the filtering requirements. Moreover, the sintered metal of filter strips 36 have very how thermal mass and when heated by passing a high current electrical pulse therethrough, the carbon combustion temperature of approximately 600° C. is reached in only a few seconds.

In addition to the metal filter strips 36, an inorganic filter sheet 34 is provided to complement the filter characteristics of filter strips 36 by improving the efficiency of sandwich 30 by trapping heat and reducing heat losses thereby causing particles trapped in proximity to the metal filter to combust as well. In particular, inorganic filter sheet 34 may be made from quartz, aluminosilicate, or borosilicate fibers and has the desired filter characteristics to complement those of the metal filter strips 36. This inorganic filter sheet 34, as a result of the material from which it is made, can tolerate high temperatures and hostile environments.

Preferably, the inorganic sheet 34 is manufactured by fibers having a diameter of approximately 0.5 to approximately 4.0 microns to trap particulates smaller than 10 microns with a minimal increase in back pressure. In addition, inorganic filter sheet 34 also serves as a structural support, and electrical and thermal insulation for metal filter strips 36 while providing thermal insulation to reduce overall heat losses. Inorganic filter sheet 34 is preferably dimensioned to be substantially identical to the overall size of the array of strips 36.

To increase the efficiency of filter 10 and to increase the holding capacity at low differential pressure, the filter sandwich 30 is constructed of at least two sandwiched layers where the coarser metal filter strips 36 are positioned upstream while the finer inorganic filter sheet 34 is positioned downstream. Typical filter efficiency is 75% or better.

The metal filter strips 36 and the inorganic fiber filter sheet 34 are sewn together with ceramic thread such as that sold by 3M and other companies. This assures that the two layers 36 and 34 are held in close proximity to one another for regeneration of both material while eliminating the requirement for masking and sealing around filter strips 36. This construction allows the areas not regenerated to be self-sealing once the filter is placed into operation. In addition, the sewing of layers 36 and 34 together also accommodates any thermal expansion or contraction without failure or destruction of filter sandwich 30 due to thermal cycling. Small gap areas 39 do not require masking because these areas will self-seal since no regeneration takes place in those areas. Optionally, an additional inorganic mesh 40 may be sewn into the sandwich construction to provide additional support and rigidity of the entire sandwich 30.

In accordance with the present invention, optimum filter performance is achieved when sandwich 30 is positioned with filter strips 36 being upstream while inorganic sheet 34 is positioned downstream. As a result, the coarser metal strips 36 first collect larger particles, typically 20 microns or larger, while the downstream inorganic filter sheet 34 traps particles 20 microns or smaller. Due to the low thermal mass and low radiation loss of the filter sandwich 30 of the present invention, each filter strip 36 can be independently electrically regenerated in ten to 30 seconds thereby achieving a large savings in size and energy over other designs.

In FIGS. 7–10, a first alternative embodiment of the present invention is shown. In this embodiment, a self-sealing filter sandwich 130 is shown for installation into the self-cleaning particle filter 10 shown in FIGS. 1 and 2. Filter sandwich 130 may simply be substituted for filter sandwich 30 shown in FIGS. 5 and 6 depending on the desired filter characteristics and application at hand.

Figure 7:
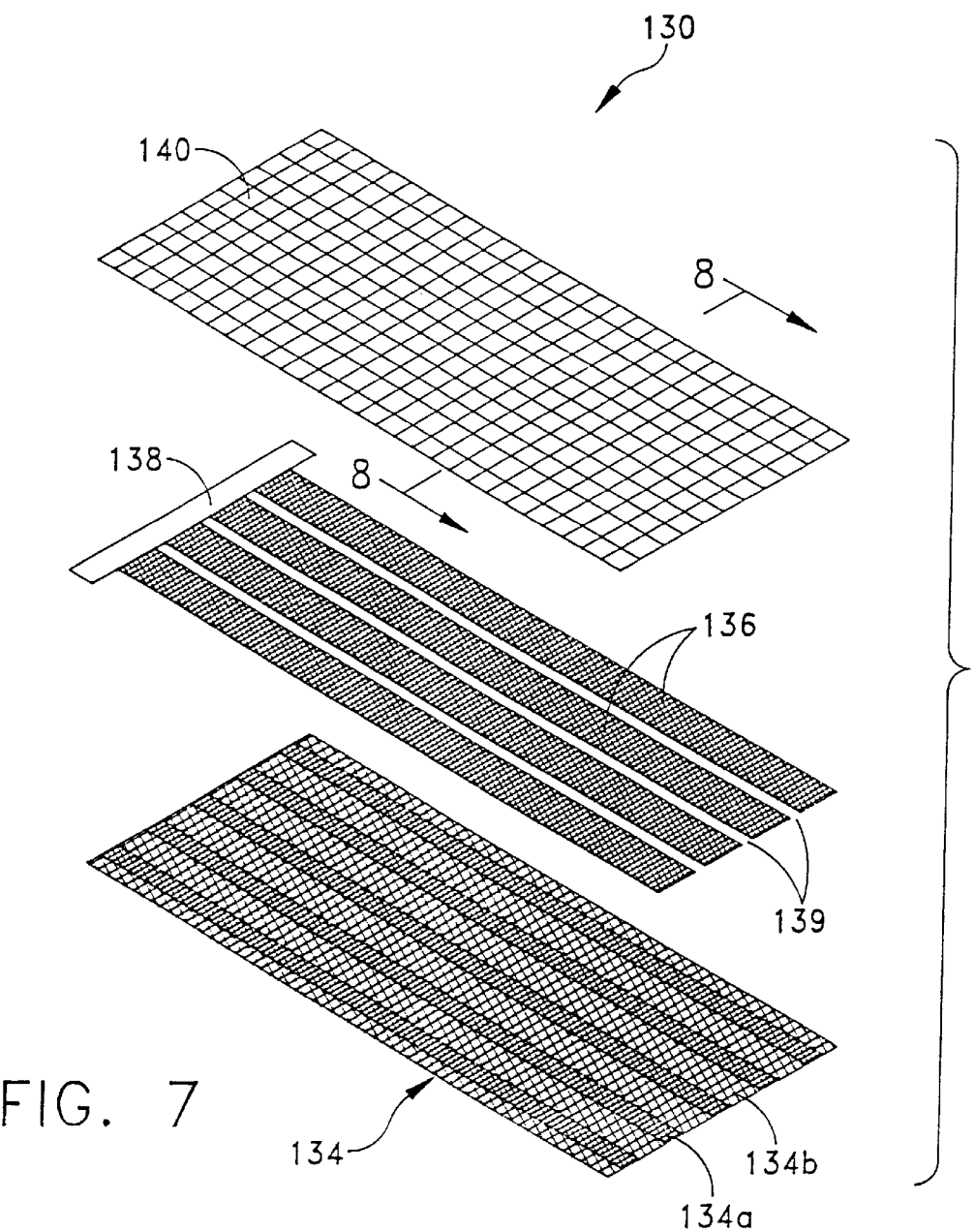
FIG. 7 is an exploded perspective view of a first alternative embodiment of the particle filter sandwich of the present invention.

Turning now to FIG. 7, an exploded perspective view of filter sandwich 130 is shown. The upstream portion of sandwich 130 includes a number of flat strips 136 of a graded, preferably sintered metal filter material. Strips 136 are positioned and spaced apart in parallel relation to one another and retain the position by binding material 138 which also provides an electrical common node. The construction of strips 136 and common node 138 is identical to the construction of strips 36 and node 38 above. Similarly, optional inorganic mesh 140 may be provided over strips 136, and sewn thereto, for additional support and stability.

The difference between the filter sandwich 130 and the filter sandwich 30 of the present invention lies with the construction of inorganic filter sheet 134. In the alternative embodiment shown in FIG. 7, inorganic filter sheet 134 is provided to complement the filter characteristics of filter strips 136 while providing thermal insulation to reduce overall heat losses and to serve as a structural support. However, inorganic sheet 134 is provided with elongated alternating regions of dense and open weave of inorganic material.

Figure 8:
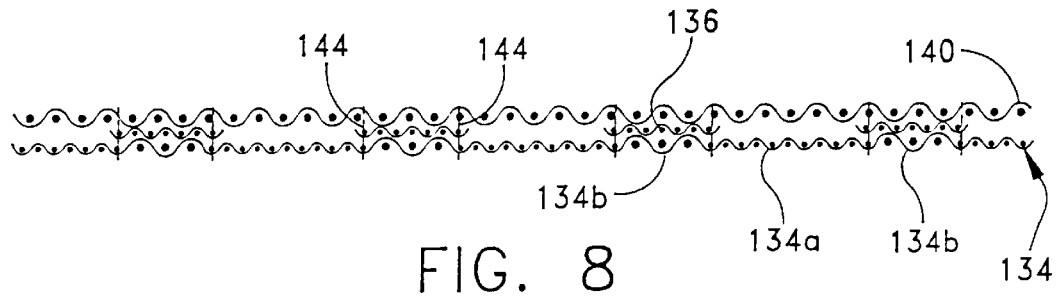
FIG. 8 is a cross-sectional view through the line 8—8 of FIG. 7 in assembled form.
Figure 9:
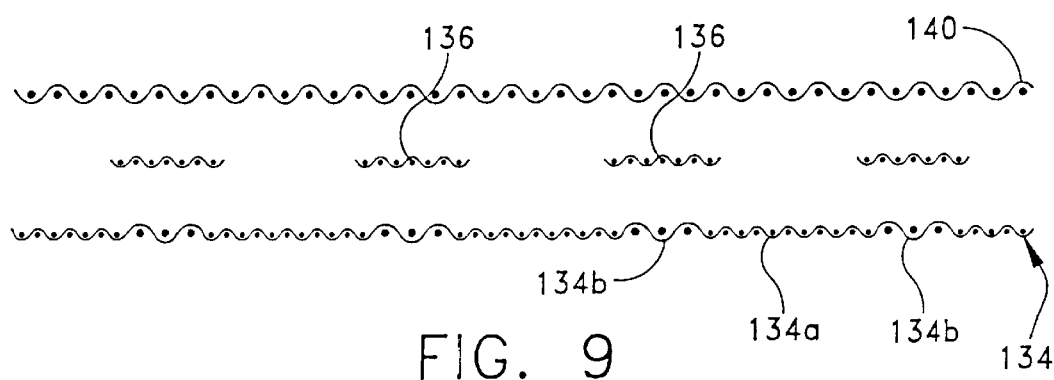
FIG. 9 is an exploded cross-sectional view through the line 8—8 of FIG. 7.

As further shown in FIGS. 8 and 9, open weave portions 134b of inorganic filter sheet 134 are positioned to align underneath metal filter strips 136 while dense weave portions 134a of inorganic sheet 134 align with gaps 139 between metal filter strips 136. For example, open weave portions 134b may be woven to filter particles 20 microns and larger while dense weave portions 134a may be woven to filter particles 5 microns or smaller. The variance in the weave density is accomplished during the weaving process resulting in a continuously woven sheet 134 with alternative regions of open and dense weave. FIG. 8 shows such a filter sandwich or sandwich construction with ceramic yarn or thread 144 retaining the sandwich together. FIG. 9 illustrates an exploded version of the filter sandwich 130 to illustrate the alignment of metal filter strips 136 over inorganic filter sheet 134; namely, its open weave areas 134a and dense weave areas 134b. It should be understood that metal filter strips 136 are positioned farther away from each other in FIG. 7 than in actual construction to clearly illustrate the alignment over the various open weave portions 134a and dense weave portions 134b.

Figure 10:
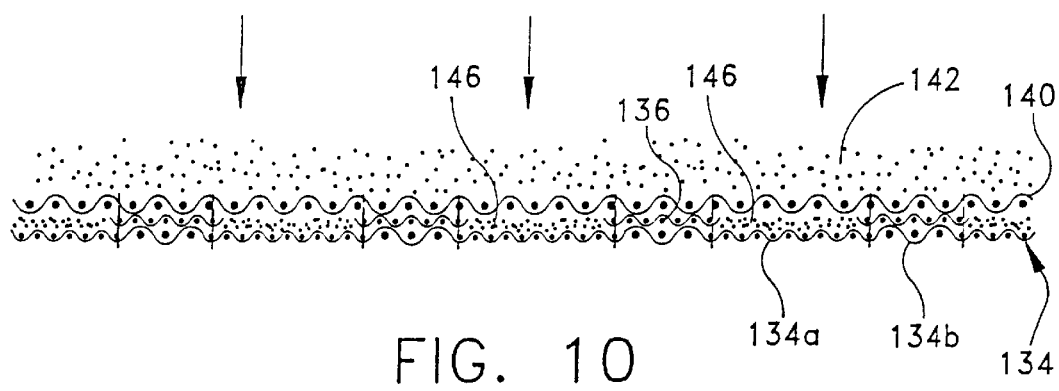
FIG. 10 is a cross-sectional view through the line 8—8 of FIG. 7 in assembled form and in the process of filtering particulate in accordance with the present invention.

FIG. 10 illustrates filter sandwich 130 in use in the self-cleaning particle filter 10 of the present invention. Exhaust gases containing particulate matter 142 flows in the direction represented by the arrows to be later trapped as referenced at 146. When the sandwich 130 is first used, particulate matter collects in metal filter strips 136 as well as in the gaps 139 positioned between the metal filter strips due to the positioning of dense weave inorganic material 134a positioned thereunder. Open weave portions 134b are positioned directly under filter strips 136 to permit sufficient air flow through metal filter strips 136 despite the collection of particulate matter within metal filter strips 136.

As a result of the alignment of filter strips 136 and gaps 139 between metal filter strips 136 being positioned over dense weave portions of inorganic filter sheet 134, trapped particulate matter 146 will collect in, fill and seal the gaps 139 between metal filter strips 136. Regeneration of metal filter strips 136 will not disrupt trapped particulate matter 146 disposed within gaps 139. Therefore, particulate matter in gaps 139 is not regenerated. As a result, the collection of trapped particulate matter 146 within gaps 139 provide an automatic self-sealing function to ensure that no particulate matter escapes through gaps 139 between metal filter strips 136.

The use of elongated metal filter strips 36 and 136, enable complete control over the regeneration process. Individual strips may be selectively regenerated to conserve energy and enhance overall filter characteristics and performance. Moreover, the use of elongated metal filter strips greatly reduces the thermal stress of the sandwich during the heating or regeneration process. Under the high temperatures of the filter regeneration, filter strips 36 and 136 may buckle or creep slightly since they are sewn directly into their respective inorganic filter sheets 34 and 134. The presence of gaps 39 and 139, respectively, enable the strips to act independently thus not effecting neighboring strips in the event thermal stress occurs.

As a result, overall thermal stress is greatly reduced particularly over prior art filters which include a single sheet to be regenerated.

In addition, the self-sealing function of the present invention shown in FIGS. 7–10, the need for a mechanical mask or frame to control exhaust flow and is completely obviated. In particular, the use of dense weave areas 134a to effectively block gaps 139 by intentionally collecting particulate matter therein completely obviates the need for mechanical masks or frames. In accordance with the present invention, filter strips 136 are automatically sealed relative to one another to raise the overall efficiency of the filter without incurring additional costs associated with additional mask or frame layers which require precise alignment.

The foregoing features and advantages of the present invention are further illustrated in connection with the a second alternative embodiment 230 of the present invention, as shown in FIGS. 11–14. The second alternative embodiment 230 shows another configuration of the invention illustrating the flexibility of the filter design of the present invention to accommodate various applications.

Figure 11:
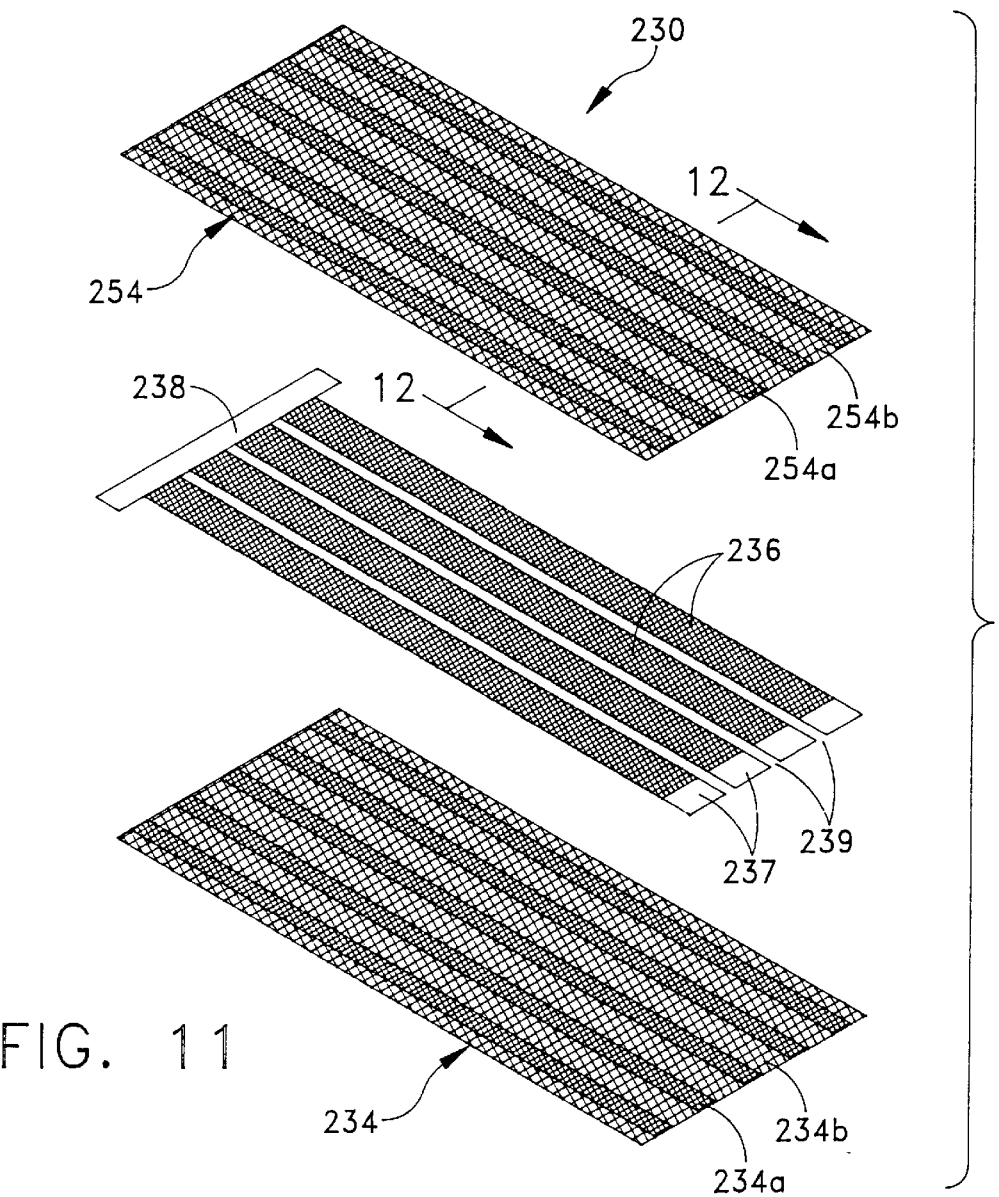
FIG. 11 is a perspective view of a second alternative embodiment of the self-cleaning particle filter in accordance with the present invention.

The second alternative embodiment provides a filter sandwich 230 which is slightly modified compared to the first alternative embodiment 130 shown in FIGS. 7–10. Referring to FIG. 11, an exploded perspective view of filter sandwich 230 is shown. The upstream portion of sandwich 230 includes a number of flat strips 236 of a graded, preferably sintered metal filter material. Strips 236 are positioned and spaced apart in parallel relation to one another and retain the position by binding material 238 which also provides an electrical common node. Individual electrical contacts 237 are also provided to permit individual control of each strip 236. The construction of strips 236 and common node 238 is identical to the construction of strips 36 and node 38 above.

The difference between the filter sandwich 130 and the filter sandwich 230 of the present invention is that optional inorganic mesh 140 is replaced with a second sheet 254 of inorganic fiber filter material in addition to the first sheet 234 of inorganic fiber filter material to provide a full sandwich about strips 236.

In similar fashion to the first alternative embodiment shown in FIGS. 7–10, inorganic filter sheets 234 and 254 are provided to complement the filter characteristics of filter strips 236 while providing thermal insulation to reduce overall heat losses and to serve as a structural support. Filter sheets 234 and 254 are provided with elongated alternating regions of dense and open weave of inorganic material. As further shown in FIG. 12, open weave portions 234b of inorganic filter sheet 234 are positioned to align underneath metal filter strips 236 while dense weave portions 234a of inorganic sheet 234 align with gaps 239 between metal filter strips 236. In addition, open weave portions 254b of inorganic filter sheet 254 are positioned to align above metal filter strips 236 while dense weave portions 254a of inorganic sheet 254 align with gaps 239 between metal filter strips 236. The employment of complementary filter sheets on both the top and bottom of the filter strips 236, to form a full sandwich, further enhances the overall efficiency of the filter construction.

Figure 12:
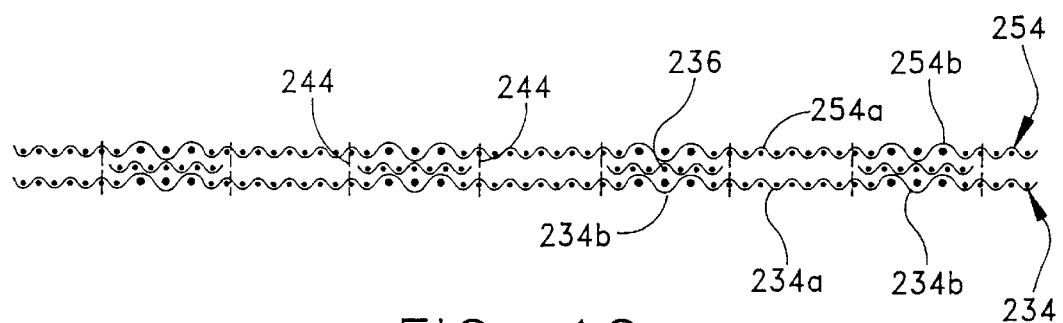
FIG. 12 is a cross-sectional view through the line 12—12 of FIG. 11.

For example, open weave portions 234b and 254b may be woven to filter particles 20 microns and larger while dense weave portions 234a and 254a may be woven to filter particles 5 microns or smaller. The variance in the weave density is accomplished during the weaving process resulting in a continuously woven sheets 234, 254 with alternative regions of open and dense weave. FIG. 12 shows such a filter sandwich or sandwich construction with ceramic yarn or thread 244 retaining the sandwich together. The ceramic yarn 244 is preferably positioned through the dense portions of inorganic material 234 and 254.

Figure 13:
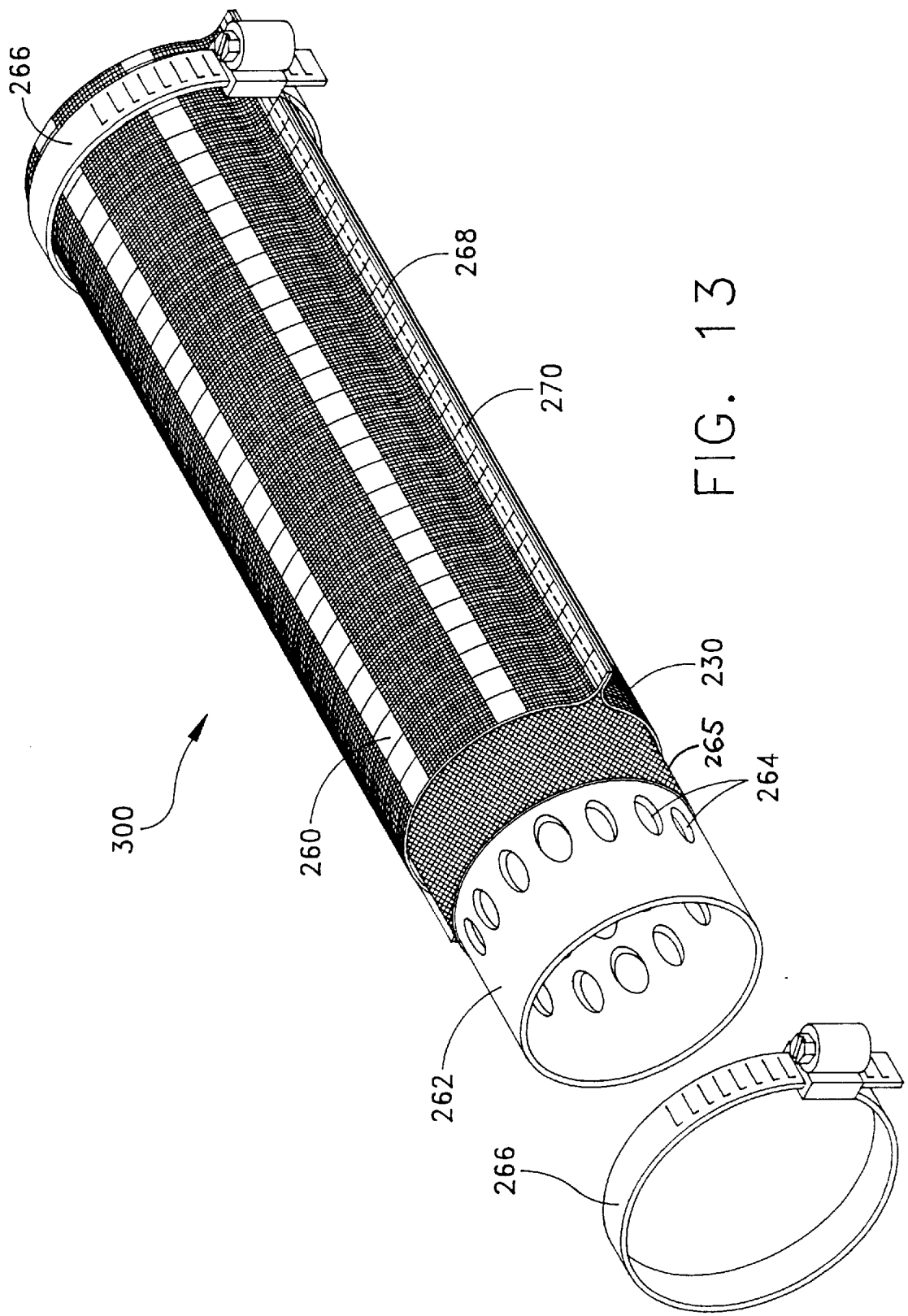
FIG. 13 is a perspective view of the self-cleaning particle filter in accordance with the second alternative embodiment of the present invention as installed on a carrier tube.
Figure 14:
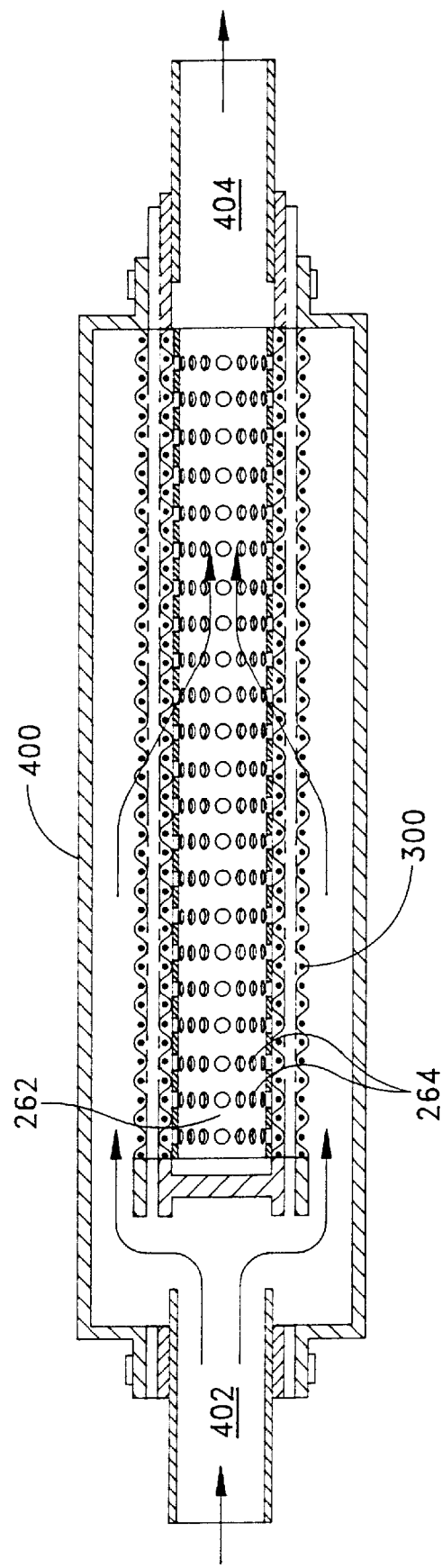
FIG. 14 is a cross-sectional view through of the self-cleaning particle filter in accordance with the second alternative embodiment as installed on a carrier tube and mounted within a housing while in the process of filtering particulate in accordance with the present invention.

In the actual application in the field, the filter sandwich 230 may be employed in a housing configuration as shown in FIG. 2, or, more preferably, in the housing configuration shown in FIGS. 13 and 14. In particular, in this embodiment, a cylindrical configuration is employed to facilitate the overall manufacture, assembly and use of the filter sandwich 230 of the present invention into a usable sandwich 300. As best seen in FIG. 13, such a cylindrical configuration is easily constructed by first forming two full filter sandwiches 230 and 260 each constructed in accordance with FIGS. 11 and 12 the longitudinal edges 270 are sewn with ceramic thread 269, or the like, to form a flattened cylinder with open top and bottom ends. A carrier tube 262, preferably metal, with perforations 264 is inserted into the flattened cylinder to provide a structured cylindrical shape as shown in FIG. 13. Clamps 266 are employed to effectively secure the formed cylinder of filter sandwich material to carrier tube 262. Electrically insulative sleeve 265 is preferably position between carrier tube 262 and filter sandwiches 230 and 260 to prevent the electrical shorting of the metal filter strips 236 therein.

In use, cylindrical sandwich 300 is mounted within 400 housing having an input port 402, which supplies Diesel exhaust, and an outlet port 404 which is downstream and supplies filtered exhaust into the atmosphere. Exhaust is introduced into housing 400 at inlet port 402 which passes through the outer wall of sandwich 300 and through perforations 264 in carrier tube 262 into the interior of cylindrical sandwich 300. Filtered exhaust then exits through outlet port 404 from the interior of cylindrical sandwich 300.

It should be understood that the second alternative embodiment is one of many possible applications of the present invention. For example, the cylindrical sandwich 300 may be formed as a unitary seamless cylindrical configuration instead of employment two cylinder halves as shown in FIG. 13. In addition, sandwich 300 may be square or rectangular in cross-section depending on the application at hand. The number of metal filter strips 236 may be modified and selected to accommodate the particular filtration application. While the metal filter strips 236 are preferably oriented longitudinally along the length of sandwich 300. Strips 236 may run horizontally if the application and environment so requires. The exhaust flow is preferably from the outside of sandwich 300 to the interior thereof, however, the flow may be reversed where exhaust is first supplied to the interior of sandwich to exit from the exterior of the sandwich. Also, while strips 36, 136 and 236 are shown as flat, they may also be corrugated, pleated and other non-flat configurations to suit the given application.

It would be appreciated by those skilled in the art that various changes and modifications can be made to the illustrated embodiments without departing from the spirit of the present invention. All such modifications and changes are intended to be covered by the appended claims.

What is claimed is:

1. A Diesel particulate filter sandwich, comprising:

a first sheet of inorganic fiber filter material; said first sheet of inorganic fiber filter material being positioned to serve as a downstream filter;

a plurality of electrically resistive metal filter strips affixed to said organic fiber filter sheet in parallel and spaced apart relation to one another and defining gaps therebetween; said plurality of electrically resistive metal filter strips being positioned to serve as upstream filters;

a second sheet of inorganic fiber filter material; said second sheet of inorganic fiber filter material affixed to said first sheet of inorganic fiber filter material with said plurality of electrically resistive metal filter strips disposed therebetween;

means attached to said plurality of metal filter strips for applying an electrical current through said plurality of electrically resistive metal filter strips to heat said plurality of electrically resistive metal filter strips above the combustion point of entrapped Diesel exhaust particulate, said plurality of electrically resistive metal filter strips being positioned such that when an electrical current applied through said plurality of electrically resistive metal filter strips, sufficient heat is generated to bum off entrapped Diesel exhaust particulate;

said first sheet of inorganic fiber filter material including alternating parallel and longitudinal regions of relatively dense weave and relatively open weave; said regions of relatively open weave of said first sheet of inorganic fiber filter material being substantially aligned with said plurality of electrically resistive metal filter strips and said regions of relatively dense weave of said first sheet of inorganic fiber filter material being substantially aligned with said gaps; and said second sheet of inorganic fiber filter material including alternating parallel and longitudinal regions of relatively dense weave and relatively open weave; said regions of relatively open weave of said second sheet of inorganic fiber filter material being substantially aligned with said plurality of electrically resistive metal filter strips and said regions of relatively dense weave of said second sheet of inorganic fiber filter material being substantially aligned with said gaps; whereby Diesel particulate collects in said gaps to self-seal said plurality of electrically resistive metal filter strips relative to one another.

2. The Diesel particulate filter sandwich of claim 1, wherein said first sheet of inorganic fiber filter material and said second sheet of fiber filter material are manufactured of a material selected from the group consisting of quartz, aluminosilicate and borosilicate.

3. The Diesel particulate filter sandwich of claim 1, wherein said plurality of electrically resistive metal filter strips are manufactured from a graded sintered alloy of Iron, Chromium, and Aluminum.

4. The Diesel particulate filter sandwich of claim 1, wherein said plurality of electrically resistive metal filter strips each have a thickness which is graded from coarse to fine running from upstream to downstream.

5. The Diesel particulate filter sandwich of claim 1, wherein said plurality of electrically resistive metal filter strips can filter particulate matter of a size of 20 microns or larger.

6. The Diesel particulate filter sandwich of claim 1, wherein said first sheet of inorganic fiber filter material and said second sheet of inorganic fiber filter material can filter particulate matter of a size of 2.5 microns or larger.

7. The Diesel particulate filter sandwich of claim 1, wherein said plurality of electrically resistive metal filter strips are affixed to said first sheet of inorganic fiber filter and said second sheet of inorganic fiber filter material by ceramic thread.

8. The Diesel particulate filter sandwich of claim 1, wherein said plurality of electrically resistive metal filter strips resist oxidation, carburization, and sulphidation at temperatures up to 1100 degrees Centigrade.

9. The Diesel particulate filter sandwich of claim 1, wherein said Diesel particulate filter sandwich is configured to be regenerated in less than 30 seconds per strip.

10. A Diesel particulate filter, comprising:

a first cylindrical layer of inorganic fiber filter material;

a plurality of electrically resistive metal filter strips affixed to said first cylindrical layer of inorganic fiber filter material in parallel and spaced apart relation to one another;

a second cylindrical layer of inorganic fiber filter material affixed to said first cylindrical layer of inorganic fiber filter material with said first plurality of metal filter strips disposed therebetween; said first cylindrical layer of inorganic fiber filter material, said first plurality of electrically resistive metal filter strips, and said second cylindrical layer of inorganic fiber filter material forming a filter sandwich having an interior void and outer surface;

housing means for encasing said filter sandwich; said housing means including an inlet port and an outlet port; said inlet port positioned to feed unfiltered Diesel exhaust from said outer surface of said filter sandwich to said interior void of said filter sandwich; said outlet port positioned to receive filtered exhaust from said interior void of said filter sandwich; and means attached to said plurality of metal filter strips for applying a voltage across said plurality of electrically resistive metal filter strips to heat said first plurality of electrically resistive metal filter strips above the combustion point of entrapped Diesel exhaust particulate, said plurality of electrically resistive metal filter strips being positioned such that when a voltage is applied across said first plurality of electrically resistive metal filter strips, sufficient heat is generated to burn off entrapped Diesel exhaust particulate.

11. The Diesel particulate filter of claim 10, further comprising:

a perforated sandwich carrier tube disposed within said interior void of said sandwich.

12. The Diesel particulate filter of claim 11, wherein said perforated sandwich carrier tube is manufactured of metal.

13. A Diesel particulate filter sandwich, comprising:

a first sheet of inorganic fiber filter material; said first sheet of inorganic fiber filter material being positioned to serve as a downstream filter; said first sheet of inorganic fiber filter material being able to filter particulate matter of a size of 2.5 microns or larger;

a plurality of electrically resistive metal filter strips affixed to said first sheet of inorganic fiber filter material in parallel and spaced apart relation to one another and defining gaps therebetween; said plurality of electrically resistive metal filter strips being positioned to serve as upstream filters;

a second sheet of inorganic fiber filter material; said second sheet of inorganic fiber filter material being affixed to said first sheet of inorganic fiber filter material with said plurality of electrically resistive metal filter strips disposed therebetween; said second sheet of inorganic fiber filter material being able to filter particulate matter of a size of 2.5 microns or larger; and means attached to said plurality of metal filter strips for applying an electrical current through said plurality of electrically resistive metal filter strips to heat said plurality of electrically resistive metal filter strips above the combustion point of entrapped Diesel exhaust particulate, said plurality of electrically resistive metal filter strips being positioned such that when an electrical current applied through said plurality of electrically resistive metal filter strips, sufficient heat is generated to burn off entrapped Diesel exhaust particulate.

14. The Diesel particulate filter sandwich of claim 13 wherein said first sheet of inorganic fiber filter material and said second sheet of inorganic fiber filter material each include alternating parallel and longitudinal regions of relatively dense weave and relatively open weave; said regions of relatively open weave of said first sheet of fiber filter material and said second sheet of fiber filter material each respectively being substantially aligned with said plurality of electrically resistive metal filter strips and said regions of relatively dense weave of said first sheet of fiber filter material and said second sheet of fiber filter material each respectively being substantially aligned with said gaps; whereby Diesel particulate collects in said gaps to self-seal said plurality of electrically resistive metal filter strips relative to one another.

15. The Diesel particulate filter sandwich of claim 13, wherein said first sheet of inorganic fiber filter material and said second sheet of fiber filter material are manufactured of a material selected from the group consisting of quartz, aluminosilicate and borosilicate.

16. The Diesel particulate filter sandwich of claim 13, wherein said plurality of electrically resistive metal filter strips are manufactured from a graded sintered alloy of Iron, Chromium, and Aluminum.

17. The Diesel particulate filter sandwich of claim 13, wherein said plurality of electrically resistive metal filter strips each have a thickness which is graded from coarse to fine running from upstream to downstream.

18. The Diesel particulate filter sandwich of claim 13, wherein said plurality of electrically resistive metal filter strips can filter particulate matter of a size of 20 microns or larger.

19. The Diesel particulate filter sandwich of claim 13, wherein said plurality of electrically resistive metal filter strips resist oxidation, carburization, and sulphidation at temperatures up to 1100 degrees Centigrade.

20. The Diesel particulate filter sandwich of claim 13, wherein said Diesel particulate filter sandwich is configured to be regenerated in less than 30 seconds per strip.

* * * * *